US009573344B2

(12) United States Patent
Illsley et al.

(10) Patent No.: US 9,573,344 B2
(45) Date of Patent: Feb. 21, 2017

(54) PROCESS FOR OPTIMISING A GAS BARRIER COATING

(75) Inventors: Derek R. Illsley, Frome (GB); Graham T. Street, London (GB)

(73) Assignee: Sun Chemical B.V., Weesp (NL)

( * ) Notice: Subject to any disclaimer, the term of this patent is extended or adjusted under 35 U.S.C. 154(b) by 1275 days.

(21) Appl. No.: 13/496,142

(22) PCT Filed: Sep. 1, 2010

(86) PCT No.: PCT/GB2010/001658
§ 371 (c)(1),
(2), (4) Date: May 29, 2012

(87) PCT Pub. No.: WO2011/033247
PCT Pub. Date: Mar. 24, 2011

(65) Prior Publication Data
US 2012/0231188 A1 Sep. 13, 2012

Related U.S. Application Data

(60) Provisional application No. 61/276,768, filed on Sep. 15, 2009.

(51) Int. Cl.
| B32B 1/00 | (2006.01) |
| B32B 7/12 | (2006.01) |
| B32B 27/08 | (2006.01) |
| B32B 27/32 | (2006.01) |
| B32B 27/36 | (2006.01) |
| C09J 5/02 | (2006.01) |

(52) U.S. Cl.
CPC ............. *B32B 7/12* (2013.01); *B32B 27/08* (2013.01); *B32B 27/32* (2013.01); *B32B 27/36* (2013.01); *C09J 5/02* (2013.01); *B32B 2250/24* (2013.01); *B32B 2250/242* (2013.01); *B32B 2255/10* (2013.01); *B32B 2255/26* (2013.01); *B32B 2307/7242* (2013.01); *B32B 2439/00* (2013.01); *C09J 2400/226* (2013.01); *C09J 2400/228* (2013.01); *C09J 2423/043* (2013.01); *C09J 2429/003* (2013.01); *C09J 2459/003* (2013.01); *Y10T 428/1324* (2015.01); *Y10T 428/1341* (2015.01); *Y10T 428/273* (2015.01)

(58) Field of Classification Search
CPC ............ B32B 7/12; B32B 27/32; B32B 27/36; B32B 2250/24; B32B 2250/242; B32B 2255/10; B32B 2255/26; B32B 2307/7242; B32B 2439/00; B32B 27/08; Y10T 428/273; Y10T 428/1324; Y10T 428/1341; C09J 5/02; C09J 2400/226; C09J 2400/228; C09J 2423/043; C09J 2429/003

See application file for complete search history.

(56) References Cited

U.S. PATENT DOCUMENTS

| 5,766,751 A | 6/1998 | Kotani et al. | |
| 2010/0189944 A1* | 7/2010 | Illsley | B32B 27/18 428/36.7 |

FOREIGN PATENT DOCUMENTS

| CA | 2 697 626 A1 | 3/2009 | |
| CN | 1122117 A | 5/1996 | |
| CN | 1248588 A | 3/2000 | |
| EP | 0 590 263 A2 | 4/1994 | |
| GB | 2452086 A | 2/2009 | |
| GB | WO 2009027648 A1 * | 3/2009 | ............. B32B 27/18 |
| JP | 2004-034616 A | 2/2004 | |
| JP | 2007-136974 A | 6/2007 | |
| JP | 2008-266522 A | 11/2008 | |
| WO | 2007/062391 A2 | 5/2007 | |
| WO | 2009/027648 A1 | 3/2009 | |

OTHER PUBLICATIONS

Australian Examination Report No. 1, issued in counterpart Australian Appln. No. 2010297060, dated Dec. 4, 2013.
Chinese Office Action, issued in counterpart Chinese Appln. No. 201080041118.9, dated Jan. 6, 2014. (English language translation provided).
Japanese Office Action, issued in counterpart Japanese Appln. No. 2012-528440, dated Feb. 12, 2014. (English language translation provided).

* cited by examiner

*Primary Examiner* — Jacob T Minskey
*Assistant Examiner* — Vishal I Patel
(74) *Attorney, Agent, or Firm* — Charles C. Achkar; Ostrolenk Faber LLP

(57) ABSTRACT

A process for enhancing the gas barrier properties of a composite laminate material whilst maintaining adequate bond strength, in which a gas barrier coating comprising a clay dispersion and a polymer solution or dispersion is positioned between two flexible plastics films using an adhesive, wherein a coating is applied to a first flexible polymer film at a coating weight (D), an adhesive is applied to either or both of the coated side of the first film or to a second polymer film and adhering the first and second films together to provide a material in which: (A/B). (C/D)>200, and in which: A/B>75; C>1.0; and D<1.5; wherein: A=Oxygen Transmission Rate for the laminate at 23 0C and 50% RH without the coating; B=Oxygen Transmission Rate for the laminate at 23 0C and 50% RH with the coating; C=Bond Strength in N/15 mm after the adhesive has fully cured; D=Coating Weight in g/m² (dry).

12 Claims, No Drawings

PROCESS FOR OPTIMISING A GAS BARRIER COATING

This application is a national stage application of PCT/GB2010/001658, filed Sep. 1, 2010, which claims priority from U.S. Provisional Patent Application No. 61/376,768, filed on Sep. 15, 2009, all of which are incorporated herein by reference in their entirety.

The present invention relates to gas barrier coatings, particularly having the ability to block the passage of oxygen, and which may be used to coat and impart gas barrier properties to a variety of materials, notably packaging for foods and pharmaceuticals, where exposure to oxygen needs to be eliminated or restricted.

Synthetic plastics materials have long been used for the packaging of foods and other materials which need protection from handling and from moisture. However, in recent years, it has become appreciated that, in addition, many foods and other sensitive materials benefit from being protected from atmospheric oxygen. A wide variety of multi-layer laminate structures has been developed to provide barrier properties and other performance characteristics suited to a pack's purpose. These laminates may be any combination of plastic, metal or cellulosic substrates, and may include one or more coating or adhesive layers. Laminates which include polymeric films having metals or inorganic compounds, such as silicon oxides, deposited thereon have been found to give good general barrier properties and are widely used. However, they may lose their ability to prevent the ingress of oxygen altogether at high temperatures, for example when the packaged material is retorted in order to sterilise and/or cook it. Moreover, the inorganic layer of these types of laminate is rather brittle and may crack or break when the laminate is flexed, resulting in a loss of the gas barrier properties.

More recently, gas barrier coatings comprising dispersed clay, especially nanoparticles, and a hydrophilic polymer, such as polyvinyl alcohol (PVA) or ethylene-vinyl alcohol copolymer (EVOH), have been used, as described, for example, in U.S. Pat. No. 6,599,622, EP 0 590 263, JP01313536A2, JP2007-136984, EPO 479 031 or U.S. Pat. No. 4,818,782. Where these are used as a surface coating, as is described in this prior art, there are no problems. However, we have found that, for many purposes, it is desirable that the coating should have a covering as well as a substrate, and, if the gas barrier coating is to be sandwiched between two films of a laminate in this way, then the bond strength between the films and the coating becomes an issue.

Gas barrier coatings including polyvinyl alcohol (PVA) and/or ethylene vinyl alcohol (EVOH) copolymers have proved difficult to formulate and apply in an efficient manner that results in both good bond strengths between the flexible plastics films and adequate gas barrier properties. In order to ensure that a sufficient gas barrier are achieved, especially on film materials that have a relatively high gas permeability, gas barrier coatings are generally applied at a relatively high coating weights. However, increasing the coating weight is typically detrimental to the bond strength between films and necessitates slower press speeds.

WO 2009/027648 sets out that in order to maintain adequate bond strength of a composite in which a gas barrier coating is positioned between two flexible plastics films using an adhesive, it is necessary that the clay dispersion and the polymer solution or dispersion should be kept separate until shortly before they are to be applied. WO 2009/098463 sets out that adequate bond strengths can be achieved if a poly(ethyleneimine) is included in the polymer dispersion or solution.

It has now been found that a laminate material which provides an advantageous balance of properties can be obtained if the coating is applied such that $$X=(A/B)(C/D)>200,$$

in which:
A=Oxygen Transmission Rate for the laminate at 23° C. and 50% RH without the coating;
B=Oxygen Transmission Rate for the laminate at 23° C. and 50% RH with the coating;
C=Bond Strength in N/15 mm after the adhesive has fully cured;
D=Coating Weight in $g/m^2$ (dry);
provided that:
A/B>75
C>1.0
D<1.5.

The interrelationship between the coating weight, barrier properties and bond strength has been evaluated and it has been found that when a process for preparing a gas barrier laminate material is tailored to meet that criteria, an optimal balance of properties is be achieved.

According to one aspect, the invention provides a process of enhancing the gas barrier properties of a composite laminate material whilst providing an adequate bond strength between two flexible plastics films, in which a gas barrier coating comprising a clay and a polymer is positioned between the two flexible plastics films, wherein
a. a first flexible polymer film is coated with an aqueous dispersion of a clay, and PVA and/or EVOH;
b. an adhesive coating is applied to either or both of the coated side of the first film or to a second flexible polymer film; and
c. the first and second films are adhered together,
to provide a laminate material in which:

$$(A/B)\cdot(C/D)>200,$$

and in which:
A/B>75;
C>1.0; and
D<1.5,
wherein:
A is the Oxygen Transmission Rate for the laminate at 23° C. and 50% RH without the coating;
B is Oxygen Transmission Rate for the laminate at 23° C. and 50% RH with the coating;
C is the Bond Strength in N/15 mm between the first and second flexible plastics films after the adhesive has fully cured; and
D is the Coating Weight in $g/m^2$ (dry) of the gas barrier coating.

As such, the invention advantageously provides a method of optimising the thickness of the coating material applied in the production of a laminate material having gas barrier properties. By way of the invention the weight and/or thickness of barrier coating is advantageously minimised whilst retaining adequate barrier properties. Furthermore, adequate bond strength between the coated flexible film and the overlying layer of film is provided. Therefore a laminate material may be prepared in an efficient manner using a thin barrier coating that provides a significant enhancement in gas barrier properties whilst also providing good bond strength.

In a further aspect, the invention provides a gas barrier laminate material prepared in accordance with the process of the invention. In one embodiment the invention provides a gas barrier laminate material a first flexible polymer film coated with a coating layer comprising PVA and/or EVOH dispersed with a clay, the coated side of first flexible polymer film being adhered to a second flexible polymer film via a layer of adhesive, in which:

$(A/B) \cdot (C/D) > 200$, and in which:
A/B>75;
C>1.0; and
D<1.5
wherein:
A=Oxygen Transmission Rate for the laminate at 23° C. and 50% RH without the coating;
B=Oxygen Transmission Rate for the laminate at 23° C. and 50% RH with the coating;
C=Bond Strength in N/15 mm after the adhesive has fully cured;
D=Coating Weight in g/m² (dry).

In one aspect the invention provides a packaged foodstuff, pharmaceutical or other material sensitive to oxygen, wherein the packaging comprises a gas barrier material according to the invention.

In one aspect, the present invention consists in a process for preparing a gas barrier film, comprising mixing a solution or dispersion of a PVA and/or EVOH with an aqueous dispersion of a clay, and then, carrying out the steps:
1. coating a first flexible polymer film with the resulting mixture;
2. applying an adhesive coating to either or both of the coated side of the first film or to a second flexible polymer film; and
3. adhering the first and second films together, the bond strength between the two films being at least 1.0N/15 mm, preferably at least 1.5 N/15 mm, after full cure of the adhesive has been achieved;
in which:

$(A/B) \cdot (C/D) > 200$,

A=Oxygen Transmission Rate for the laminate (23° C./50% RH) without the coating;
B=Oxygen Transmission Rate for the Laminate with the coating;
C=Bond Strength in N/15 mm;
D=Coating Weight in gsm (dry);
provided that:
A/B>75
C>1.0
D<1.5.

In one aspect, the process for preparing a gas barrier film, comprises mixing a solution or dispersion of a PVA and/or EVOH with an aqueous dispersion of a clay, and then, within 24 hours of completing the mixing, carrying out the step: a. of coating a first flexible polymer film with the resulting mixture. Advantageously, step a. is carried out within 12 hours, for example, 6 hours, especially 2 hours of completing the mixing. In a further embodiment, there is provided a process for preparing a gas barrier film, comprising mixing a solution or dispersion of a PVA and/or EVOH with an aqueous dispersion of a clay, and then, within 24 hours of completing the mixing, carrying out the steps: a. to c. to provide the laminate material. Advantageously, steps a. to c. are carried out within 12 hours, for example, 6 hours, especially 2 hours of completing the mixing.

The coating material is advantageously supplied to the customer as a two pack composition, one pack comprising a solution or dispersion of a PVA and/or EVOH, and the other comprising an aqueous dispersion of a clay.

The time taken for the adhesive to cure fully will vary depending on the nature of the adhesive and will be well known to those skilled in the field. For example, it can take up to 10 days at room temperature with conventional isocyanate-based adhesives, and up to 10 days at 50° C. with aliphatic isocyanate 2-pack types.

Where the adhesive is applied to the second film only, steps a. and b. may be carried out in any order. Step c, in any event, is carried out after steps a. and b.

There is no particular restriction on the nature of the PVA or EVOH used in the present invention, provided that it can form a solution or dispersion in an aqueous medium. Such polymers have a high proportion of free hydroxy groups which can form hydrogen bonds with salt groups in the metal silicate and thus serve as a dispersing agent for the silicate. Examples of such polymers are described in, for example, U.S. Pat. No. 6,599,622 or EP00590263B1, the disclosure of which is incorporated herein by reference.

The clay used is preferably nanoparticulate. A nanoparticulate clay is a clay with particles having at least one dimension in the nanometre range, i.e. of less than 100 nm. Typically nanoparticulate clay particles have a maximum dimension of less than 100 nm, for example a maximum dimension of less than 50 nm, such as a maximum dimension of less than 20 nm. Also preferably a portion of the clay mineral has been intercalated or exfoliated during the dispersion process. There is no restriction on the type of clay used in this invention provided it is sufficiently dispersible in an aqueous medium and that it is capable of being intercalated or exfoliated during dispersion. In an exfoliated form the aspect ratio of the clay (i.e. the ratio between the length and thickness of a single clay 'sheet') will have an impact on the level of oxygen barrier achieved. The greater the aspect ratio, the more the rate of oxygen diffusion through the dry coating and laminate will be reduced. Clay minerals with aspect ratios between 20 and 10,000 are preferably used. Particularly preferred are those minerals having an aspect ratio greater than 100. Examples of suitable clays include kaolinite, montmorillonite, atapulgite, illite, bentonite, halloysite, kaolin, mica, diatomaceous earth and fuller's earth, calcined aluminium silicate, hydrated aluminium silicate, magnesium aluminium silicate, sodium silicate and magnesium silicate. Commercial examples of suitable materials are Cloisite Na+ (available from Southern Clay), Bentone N.Dak. (available from Elementis). Of these, the montmorillonite clays, are preferred, nanoparticulate clays being most preferred.

The coating composition is applied in the form of a solution or dispersion of the clay and the polymer in a suitable solvent. The solvent is preferably aqueous, and is more preferably water, optionally containing a small quantity of a miscible co-solvent, such as an alcohol (for example ethanol, n-propanol or isopropanol) or a ketone (such as acetone). Where a co-solvent is present, this can be up to 75% (w/w) of the total composition. However, it is preferred that the content of the co-solvent is less than 50%, more preferably less than 50% of the entire composition. The preferred co-solvent is an alcohol, preferably n-propanol, ethanol or isopropanol.

If desired, in addition to the PVA and/or EVOH, other polymers or resins may be included in the coating composition, provided these co-resins are themselves compatible in the final composition. Examples of such polymers and resins include solution acrylics, acrylic emulsions, polyesters, alkyds, sulphopolyesters, polyurethanes, vinyl acetate emulsions, poly(vinyl butyral), poly(vinyl pyrrolidone), poly(ethylene imine), polyamides, polysaccharides, proteins, epoxies, etc. It is also possible to include sol-gel precursors in these compositions, e.g. a hydrolysate of tetraethyl orthosilicate.

In one embodiment, the first flexible polymer film is coated with an aqueous dispersion of (1) a clay, (2) a PVA and/or EVOH, and (3) a poly(ethyleneimine). The coating material is advantageously supplied to the customer as a single composition.

The overall solids content of the coating composition is preferably from 0.5 to 15%; more preferably from 2 to 8% (w/w), which is relatively low, in order to delay or prevent the premature onset of gelation of the coating, which results from the build up of structure held in place by weak electrostatic charges.

In one embodiment, the coating is be supplied to the customer as a two pack, the first part containing the dispersed clay, the second an aqueous solution of the PVA and/or EVOH and optionally other soluble and dispersed resins.

The amount of polymer (total of PVA and/or EVOH and optional polymers and resins) in the coating composition is typically from 40 to 95% of the total solids comprising polymer and clay, for example from 50 to 90%. In other words, the ratio of clay to polymer is typically from about 1.5:1 to about 1:19, for example from about 1:1 to about 1:9. Advantageously, the amount of clay in the coating composition is from 20 to 45% of the total solids comprising polymer and clay, especially from 35 to 45%. In other words, the ratio of clay to polymer is advantageously from about 1:5 to about 5:9, especially from about 5:7 to about 5:9. The concentration of clay and polymer in the solution will depend on their solubility/dispersability and the way in which the coating will be applied (gravure, flexo, curtain coating, roll coating, dip coating, spray, etc.), the amount of solvent employed preferably being the minimum needed to achieve sufficient flowability to coat the substrate adequately. In general, the clay will be employed in the form of a 1.0-15% by weight solution/dispersion in water or water+co-solvent (prior to its addition to the PVOH/EVOH containing component), and this will dictate the contents of the remaining components.

The coating composition of the present invention comprising the clay, the polymer solution or dispersion and a solvent therefore may be applied to a substrate by any conventional means. The solvent may then be removed, e.g. by heating, leaving a film comprising the clay dispersed through the polymer on the substrate. The resulting gas barrier film is then adhered to a further flexible plastics sheet.

The thickness of the coating of the present invention will depend in part on the ability of the clay to form a continuous, coherent coating layer. However, in general, the coating should be from 50 nm to 3000 nm thick, for example from 200 to 2000 nm thick. The process of the invention advantageously enables the coating to be applied at an optimum thickness that provides adequate gas barrier properties without an unnecessarily thick coating being applied.

The coatings are applied at a wet film weight of less than 1.5 g/m$^2$ (dry), especially 1.2 g/m$^2$ (dry) for example 1.0 g/m$^2$ dry. The process of the invention advantageously enables an optimum film weight to be applied. Film weight may be a more useful measure than film thickness due to the differing densities of PVA (ca. 1.3) and the clay (for montmorillonite about 2.5).

There is no particular restriction on the nature of the flexible substrate, although it is preferably a plastics film, and any material suitable for the intended use may be employed. However, where the matter being packaged with the coating film of the present invention is a foodstuff or pharmaceutical, it will normally be preferred that the plastics film or other substrate should be food grade. Examples of suitable materials include: polyolefins, such as polyethylene or polypropylene; polyesters, such as polyethylene terephthalate, polybutylene terephthalate or polyethylene naphthenate; polyamides, such as nylon-6 or nylon-66; and other polymers, such as polyvinyl chloride, polyimides, acrylic polymers, polystyrenes, celluloses, or polyvinylidene chloride,. It is also possible to use copolymers of any compatible two or more of the monomers used to produce these polymers. Furthermore, compositions of the present invention may be included in adhesively formed laminates comprising paper substrates (such as polyester and polyolefin coated paperboards commonly encountered in food packaging). We especially prefer the polyesters.

The present invention has been found to be particularly suitable for use with flexible plastic film substrates which have relatively poor inherent oxygen barrier properties. In one embodiment, the OTR of the laminate material without the coating is at least 50 cm$^3$/m$^2$/day at 23° C. at 50% RH, especially at least 80 cm$^3$/m$^2$/day at 23° C. at 50% RH. In one embodiment, the OTR of the laminate material without the coating is at least 1000 cm$^3$/m$^2$/day at 23° C. at 50% RH.

The substrate is preferably treated by corona discharge immediately prior to its being coated with the composition of the present invention. This process is well known in the art and is described, for example, in "Plastics Finishing and Decoration", edited by Donatas Satas, published by Van Nostrand Reinhold Company in 1986, at pages 80-86. In the Examples hereafter, for the corona discharge treatment we achieved a surface energy greater than 50 Dynes/cm.

The two flexible polymer films may be the same as each other or they may be different from each other.

There is no particular restriction on the nature of the adhesive used, and any adhesive commonly used for the adhesion of two or more plastics films may be employed in the present invention. Examples of suitable adhesives include solvent-based (polyurethane) types such as those from Henkel (Liofol UR3969/UR 6055, Liofol UR3640/UR6800, Liofol UR3894/UR6055), Rohm&Haas (Adcote 811/9L10) and Coim (CA2525/2526), Solvent-free polyurethane adhesives such as Liofol 7780/UR6082, UR7750/UR6071 from Henkel, and Mor-Free ELM-415A/Mor-Free CR140 from Rohm&Haas, can also be used. As well as polyurethane adhesives, epoxy-based types such as Lamal 408-40A/C5083 may be used. Waterborne adhesives, such as Aqualam 300A/300D, an epoxy type from Rohm&Haas may also be used.

The adhesive may be applied directly to one of the films and then adhered to the gas barrier coating on the other film, or it may be applied to the gas barrier coating on one film and then adhered to the other film. In any case, the order of layers will be: a plastics film; the gas barrier coating; an adhesive; and another plastics film. If desired, layers of other materials may be interposed between any two of these layers, or on either side of the 2 flexible plastic film substrates having the barrier coating between them.

The component A/B is essentially a 'barrier enhancement' factor; the ratio of oxygen transmission rates achieved without, and with, the barrier coating. This factor should be greater than 75, especially greater than 100. The oxygen transmission rate in cm$^3$/m$^2$/day is measured at 23° C. and 50% relative humidity (RH) by any standard method known the skilled person. For example, suitable ASTM standard test methods include:

D3985 Standard Test Method for Oxygen Gas Transmission Rate Through Plastic Film and Sheeting Using a Coulometric Sensor;

F1927 Standard Test Method for Determination of Oxygen Gas Transmission Rate, Permeability and Permeance at Controlled Relative Humidity Through Barrier Materials Using a Coulometric Detector; and F2622 Standard Test Method for Oxygen Gas Transmission Rate Through Plastic Film and Sheeting Using Various Sensors.

In one embodiment A/B is at least 300, for example at least 400.

For a typical PET-PE laminate with no barrier layer, the oxygen transmission rate would typically be about 100 cm$^3$/m$^2$/day. So, this means that the maximum oxygen transmission rate with a barrier coating of the current invention would be 1.33 cm$^3$/m$^2$/day.

C is a figure for bond strength, given in N/15 mm which is the force required to separate the second flexible polymer film from the first, coated, flexible polymer film. The bond strength can be measured by recording the force (in units of N/15 mm, where a 15 mm wide strip of the laminate is tested) required to separate the 2 plies of a laminate in a T-peel test. The separation speed used in the examples was 200 mm/min and the instrument used was a JJ Lloyd LRX tensiometer, equipped with a 50 N load cell. The T-peel test is a well recognised test in the packaging industry. The minimum value of C is 1.0 N/15 mm which is deemed the minimum required to provide a degree of laminate strength resulting in adequate integrity of a finished package. Advantageously, C is at least 1.2 N/15 mm, especially at least 1.5 N/15 mm.

It is important to note that the term D, for dry film weight, is very important as these coatings will generally have solid contents of less than 10% (w/w) when applied by either gravure or flexographic processes, and therefore it is unlikely that especially thick dry film thicknesses will be realistically deliverable. For example, a coating having 6% (w/w) solids of a 75/25 blend of PVA/clay when applied at 10 micron film thickness would deliver 0.61 g/m$^2$ of the PVA & clay (making allowances for the densities of PVA and clay; 1.26 and 2.5 g/cm$^3$).

The invention is further illustrated by the following non-limiting Examples.

EXAMPLES

The oxygen transmission rates of the coated samples were determined on a Mocon Oxtran 2/21 gas permeability tester at 23° C. and 50% relative humidity. The coatings were applied with a No.2 K-bar (around 12 microns) and were dried in a warm flow of air (lab prints were dried with a hair dryer).

The PET (polyethylene terephthalate) substrate film used in the examples was a freshly corona discharge treated 12 micron thick Melinex 800 film obtained from DuPont.

The OPP (orientatied polypropylene) substrate film used was a 25 micron thick MB400 film obtained from Exxon Mobil Chemical.

The PE film used in the examples to prepare the adhesively formed laminates was a lamination grade 30 μm LDPE film obtained from BPI.

The laminates were prepared by applying the coating to the treated side of the film; an adhesive was applied over the top of the dried coating and then laminated to the treated side of a 30 μm gauge poly(ethene) film. The adhesive used was supplied by Henkel, UR3969/6055, was prepared according to the manufacturer's instructions and was applied so as to achieve a final dry film weight of 2.5 g/m$^2$. The laminates were then stored for 10 days at 25° C. to ensure full cure of the isocyanate-based adhesive.

The laminates were then tested for bond strength (N/15 mm) and oxygen barrier performance (cm$^3$/m$^2$/24 h at 23° C. and 50% RH). Where the film tears (FT) during the bond strength test, this shows that the adhesive bond is stronger than the plastics film and so the bond strength is necessarily greater than 1.5 N/15 mm, and probably in excess of 3.0 N/15 mm. The last measured bond strength (M) prior to film tear was recorded.

Coating compositions 1 to 15 were prepared by blending a PVA/EVOH solution having 11% solids with a clay dispersion having a solids content of 4%. The polymer solution comprised 1.65% Mowiol 3-96, 9.35% of Exceval AQ-4104, and 15% n-propanol. The remainder of the solution was deionised water. The clay dispersion contained 4% (w/w) of Cloisite Na+ and 20% isopropanol; the remainder being deionised water. The clay was dispersed using a high shear blender (Dispermat CV).

The coatings were adjusted to gravure application viscosity (19/20 seconds flow time from a Zahn-2 cup) by diluting with a 80/20 (w/w) blend of deionised water and isopropanol.

The following Table 1 provides the detail of these coatings, along with their oxygen barrier performance, bond strength and calculated X values.

TABLE 1

| | | | | | Performance in Barrier Laminates | | | |
| --- | --- | --- | --- | --- | --- | --- | --- | --- |
| Coating | Solid Content (% w/w)*/ dry film weight (g/m$^2$) | Relative content of Clay (% w/w solids) | Substrate | OTR | Bond Strength; immediately after preparation; | Bond Strength; after 1 week of being blended | Bond Strength; after 2 weeks of being blended | X |
| none | 0 | 0 | PET | 102 | FT; M = 3.2 | — | — | — |
| none | 0 | 0 | OPP | 1350 | FT; M = 4.2 | — | — | — |
| none | 0 | 0 | PE | 1600 | FT; M = 3.8 | — | — | — |

TABLE 1-continued

Performance in Barrier Laminates

| Coating | Solid Content (% w/w)*/ dry film weight (g/m²) | Relative content of Clay (% w/w solids) | Substrate | OTR | Bond Strength; immediately after preparation; | Bond Strength; after 1 week of being blended | Bond Strength; after 2 weeks of being blended | X |
|---|---|---|---|---|---|---|---|---|
| 1 | 9.0/1.08 | 0 | PET | 1.52 | 1.3 | 1.4 | 1.3 | 81 |
| 2 | 9.0/1.08 | 10 | PET | 0.63 | 1.4 | 1.2 | 1.2 | 210 |
| 3 | 8.7/1.04 | 15 | PET | 0.51 | 1.8 | 1.2 | 1.3 | 346 |
| 4 | 8.1/0.97 | 20 | PET | 0.26 | 1.6 | 1.2 | 1.1 | 647 |
| 5 | 7.4/0.89 | 25 | PET | 0.24 | FT; M = 2.7 | FT; M = 3.3 | 1.4 | 1289 |
| 5 | 7.0/0.84 | 30 | PET | 0.15 | FT; M = 2.8 | 1.7 | 1.8 | 2267 |
| 7 | 6.6/0.79 | 35 | PET | 0.16 | FT; M = 3.0 | 2.7 | 2.8 | 2421 |
| 8 | 5.5/0.66 | 40 | PET | 0.19 | 2.3 | 1.7 | 1.9 | 1870 |
| 9 | 5.2/0.62 | 45 | PET | 0.17 | 1.7 | 1.8 | 1.9 | 1645 |
| 10 | 4.9/0.59 | 50 | PET | 0.38 | 1.4 | 1.2 | 1.8 | 637 |
| 11 | 4.8/0.58 | 55 | PET | 0.50 | 0.7† | 0.5 | 0.6 | 246 |
| 12 | 4.5/0.54 | 60 | PET | 0.82 | <0.1† | <0.1† | <0.1† | — |
| 13 | 5.5/0.66 | 40 | OPP | 1.44 | 0.4† | — | — | 568 |
| 14 | 5.5/0.66 | 40 | PE | 1.38 | 1.2 | — | — | 2108 |
| 15 | Std. 2-pack/ 0.66 | 27.5 | PET | 0.36 | FT; M = 2.8 | FT; M = 3.0 | 1.1 | 1202 |

*Solid content varies owing to adjustments made to achieve application (gravure) viscosity.
†Figures noted fall outside the limits defined above.

The "Std 2-pack" composition referred to in Table 1 is the 2-pack barrier coating supplied by Sun, under the trade name 'SunBar™ O$_2$ Barrier Coating' (ref.: 30504308 and 90108385)

To better illustrate the influence of the clay concentration on the oxygen barrier performance, coating compositions 2 to 10 were coated onto a 25 micron thick OPP film (MB400) at 12 g/m² (wet) and the oxygen transmission rates recorded. The results are shown in Table 2.

TABLE 2

Oxygen Transmission Rates on OPP

| Coating | 2 | 3 | 4 | 5 | 6 | 7 | 8 | 9 | 10 |
|---|---|---|---|---|---|---|---|---|---|
| OTR | 1.29 | 1.25 | 0.63 | 0.58 | 1.04 | 1.06 | 1.44 | 2.31 | 3.22 |

Considering the results contained within Tables 1 and 2 a preferred concentration of clay (on total solids) is preferably in the range of from 20 to 45%.

To further understand the likely performance of these coatings, the oxygen transmission rates on coated PET were measured at 23° C. & 75% RH. The results are shown in Table 3.

TABLE 3

Oxygen Transmission Rates on PET at 75% RH

| Coating | 2 | 3 | 4 | 5 | 6 | 7 | 8 | 9 | 10 |
|---|---|---|---|---|---|---|---|---|---|
| OTR | 22.13 | 19.02 | 12.65 | 10.67 | 8.00 | 6.50 | 6.37 | 5.67 | 7.15 |

These results indicate that at high RH, optimum performance is achieved with a concentration of clay of about 35-45%.

Therefore, for both maximum barrier and laminate bond strength performance, with coatings prepared according to the procedure described here (with the components as specified), a relative concentration of clay in the range 25-45% (w/w) would appear optimum.

The invention claimed is:

1. A process of enhancing the gas barrier properties of a composite laminate material whilst providing an adequate bond strength between two flexible plastics films, in which a gas barrier coating comprising a clay and a polymer is positioned between the two flexible plastics films, wherein:
   a. a first flexible polymer film is coated with an aqueous dispersion of a clay, and a PVA and/or EVOH;
   b. an adhesive coating is applied to either or both of the coated side of the first film or to a second flexible polymer film; and
   c. the first and second films are adhered together, to provide a laminate material in which:
   $(A/B) \cdot (C/D) \geq 1500$;
   and in which:
   $A/B > 75$;
   $C > 1.0$; and
   $D < 1.5$,
   wherein:
   A is the Oxygen Transmission Rate for the laminate at 23° C. and 50% RH without the coating;
   B is Oxygen Transmission Rate for the laminate at 23° C. and 50% RH with the coating;
   C is the Bond Strength in N/15 mm between the first and second flexible plastics films after the adhesive has fully cured; and
   D is the Coating Weight in g/m2 (dry) of the gas barrier coating;
   wherein the PVA and/or EVOH is an aqueous solution or dispersion; and
   wherein the aqueous dispersion of the clay and the aqueous solution or dispersion of the PVA and/or EVOH are mixed prior to step a.

2. A process for preparing a gas barrier material of claim 1, in which C, the bond strength between the two films, is greater than 1.5N/15 mm after the adhesive has fully cured.

3. A process according to claim 1, in which some or all of the clay has been intercalated or exfoliated during dispersion.

4. A process according to claim 1, in which the clay has an aspect ratio from about 20 to about 10,000.

5. A process according to claim 1, in which the amount of polymer is from about 40 to about 95% of the total solids comprising polymer and clay.

6. A process according to claim 1, in which the amount of polymer is from about 50 to about 90% of the total solids comprising polymer and clay.

7. A process according to claim 1, in which the amount of polymer is from about 20 to about 45% of the total solids comprising polymer and clay.

8. A process according to claim 1, in which the thickness of the coating is from about 50 nm to about 3000 nm.

9. A process according to claim 6, in which the thickness of the coating is from about 200 to about 2000 nm.

10. The process for preparing a gas barrier material of claim 1, in which step a, is carried out within 24 hours of completing the mixing.

11. A process according to claim 10, in which steps a, b and c are carried out within 24 hours of completing the mixing.

12. A process according to claim 11, in which steps a, b and c are carried out within 6 hours of completing the mixing.

* * * * *